US006762725B2

(12) United States Patent
Beard et al.

(10) Patent No.: US 6,762,725 B2
(45) Date of Patent: Jul. 13, 2004

(54) PC CARD RETRACTABLE ANTENNA

(75) Inventors: Paul Beard, Milpitas, CA (US); Eric P. Mitchell, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 10/364,756

(22) Filed: Feb. 11, 2003

(65) Prior Publication Data

US 2003/0128167 A1 Jul. 10, 2003

Related U.S. Application Data

(63) Continuation of application No. 09/288,376, filed on Apr. 8, 1999, now Pat. No. 6,522,299.

(51) Int. Cl.[7] ................................................ H01Q 1/24
(52) U.S. Cl. ........................ 343/702; 709/250; 455/90; 455/121; 455/557; 342/74
(58) Field of Search ............................ 709/250; 455/90, 455/121, 55; 342/74; 343/702

(56) References Cited

U.S. PATENT DOCUMENTS

| | | | |
|---|---|---|---|
| 5,183,404 A | 2/1993 | Aldous et al. ................ 439/55 |
| 5,336,099 A | 8/1994 | Aldous et al. ................ 439/131 |
| 5,338,210 A | 8/1994 | Beckham et al. ............ 439/131 |
| 5,373,149 A | 12/1994 | Rasmussen ................... 235/492 |
| 5,559,501 A | 9/1996 | Barzegar et al. ............ 304/825 |
| 5,562,504 A | 10/1996 | Moshayedi ................... 439/638 |
| 5,583,521 A | 12/1996 | Williams ..................... 343/702 |
| 5,606,732 A | 2/1997 | Vignone, Sr. ................ 455/269 |
| 5,646,635 A | 7/1997 | Cockson et al. ............. 343/702 |
| 5,739,791 A | 4/1998 | Barefield et al. ............ 343/702 |
| 5,815,120 A | 9/1998 | Lawrence et al. ........... 343/702 |
| 5,828,341 A * | 10/1998 | Delamater .................... 343/702 |
| 5,867,131 A | 2/1999 | Camp, Jr. et al. ............ 343/797 |
| 5,913,174 A | 6/1999 | Casarez et al. .............. 455/557 |
| 5,918,163 A * | 6/1999 | Rossi ........................... 455/558 |
| 5,943,018 A * | 8/1999 | Miller .......................... 343/702 |
| 5,949,379 A | 9/1999 | Yang ............................ 343/702 |
| 6,008,727 A * | 12/1999 | Want et al. ................. 340/572.1 |
| 6,133,884 A * | 10/2000 | Talvitie et al. ............... 343/702 |
| 6,172,645 B1 * | 1/2001 | Hollander et al. ........... 343/702 |
| 6,272,017 B1 * | 8/2001 | Klatt et al. ................... 361/737 |
| 6,522,299 B2 * | 2/2003 | Beard et al. ................. 343/702 |

* cited by examiner

*Primary Examiner*—Saleh Najjar
(74) *Attorney, Agent, or Firm*—Christopher P. Maiorana, P.C.

(57) ABSTRACT

A PC card with a retractable antenna for use in interfacing between a communications device and a wireless network includes an interface card portion and an antenna portion, the interface card portion having a first end, and an opposite second end, the first end having an electrical interface compatible with the communications device, the second end having an opening for slidably receiving the antenna portion, the interface card portion being dimensioned to be inserted into the PC card slot of the communications device, the antenna portion being in electrical communication with the interface card portion and dimensioned to fit inside the interface card portion, the antenna portion being accessible through the opening in the interface card portion by a user, the antenna portion being configured to extend out of the cavity and retract into the cavity of the interface card portion such that when the antenna portion is retracted into the cavity the antenna portion is substantially contained inside the interface card portion.

20 Claims, 12 Drawing Sheets

TOP VIEW, RETRACTED

EXTERNAL ANTENNA ATTACHED
(PRIOR ART)

EXTERNAL ANTENNA DETACHED
(PRIOR ART)

EXTERNAL ANTENNA ATTACHED

EXTERNAL ANTENNA DETACHED
(PRIOR ART)

EXTENDED PC CARD
(PRIOR ART)

EXTENDED PC CARD
IN LAPTOP
(PRIOR ART)

EXTENDED PC CARD INTERFERENCE
(PRIOR ART)

TOP VIEW, RETRACTED

TOP VIEW, EXTENDED

CAM, CAM TRACK

PC CARD RETRACTABLE ANTENNA

This is a continuation of U.S. Ser. No. 09/288,376 filed Apr. 8, 1999 now U.S. Pat. No. 6,522,299.

BACKGROUND OF THE INVENTION

This invention relates generally to an antenna used in conjunction with a personal computer (PC) to communicate with a wireless network, and particularly to a retractable antenna that is compatible with a PC Card slot of a personal computer, such as a PCMCIA slot.

Portable communication devices, such as lap-top computers, palm-top computers, and PDA (personal digital assistants) are becoming common in offices. For these devices to communicate with a computer network, commonly referred to as a Local Area Network (LAN), the communication device must be able to attach to the network, typically through a LAN interface adapter attached to a LAN cable. Such LAN cable connections generally restrict the mobility of communication devices. Recently, networks have been developed that allow wireless communication. For the communication device to communicate with the wireless network, the communication device must have an antenna. Typically, the antenna is attached to a wireless network card inserted into the communications device. For example, in smaller devices such as laptops the card is inserted into a PC card slot, e.g., a PCMCIA (Personal Computer Memory Card Interface Association). To avoid signal interference with the mechanics of the communications device card slot, the antenna for the wireless communications device must be located outside of the device's card slot or housing to function properly.

FIGS. 1 and 2 show a wireless network card assembly 10. The assembly 10 includes a wireless network card 12 and a removable antenna 14, where the removable antenna 14 connects to the wireless network card 12 with a cable 16 and connector 18. The wireless network card 12 is typically a PCMCIA adapter card that is sized to fit into a PCMCIA slot in a communications device. The PCMCIA standard size is approximately 55 mm in width, 85 mm in length, and 5 mm in depth. A first end 18 of the wireless network card 12 is designed to electrically connect to the communications device when the wireless network card 12 is inserted into the PCMCIA slot of the communications device. The second end 20 is designed to accept a connector 22 located on the end of cable 16. The antenna 14 may also have a base 24 to keep the antenna 14 in an upright position. When the antenna 14 is not in use, it may be detached. FIG. 2 shows the detachment of the connector 22 from the wireless network card 12. The antenna 14 is typically relatively large and bulky and if the user misplaces it, the communications device cannot generally communicate with the wireless network.

FIGS. 3 and 4 shows another wireless network card assembly 110. The wireless network card assembly 110 includes a wireless network card 112 and a removable antenna 114. This assembly 110 differs from the one shown in relation to FIG. 1 in that the antenna 114 is smaller and has an integral connector 122 that attaches to a second end 120 of the wireless network card 112. A first end 118 of the wireless network card 112 is designed to electrically connect to the communications device when the wireless network card 112 is inserted into a PCMCIA slot of the communications device. When the antenna 114 is not in use, it may be detached. FIG. 2 shows the detachment of the antenna 114 from the wireless network card 112. The antenna 114 is smaller than the antenna described in relation to FIG. 1, but again, if the user misplaces the antenna or breaks it, the communications device cannot communicate with the wireless network.

Antennas, such as the external detachable antenna (14, 114) described above, are generally required by the communications device for the wireless network to function properly. The antenna is one additional piece of equipment that could be forgotten or lost, requiring the customer to order and receive a replacement antenna before the wireless network can be accessed and used. In addition, this separate antenna, requiring assembly from the customer, increases the probability of functional problems, possibly requiring technical support.

FIG. 5 shows an extended PC card 210 that tries to solve the problems described above. The extended PC card 210 includes a wireless network card portion 212 with a fixed antenna portion 214. This PC card 210 differs from the wireless network card assemblies (10, 110), described above, in that the antenna 214 is integral with the PC card 210. This PC card helps solve the problem of misplacing or losing a removable antenna (14, 114). FIG. 6 shows the extended PC card 210 positioned in a PC card slot 230, such as a PCMCIA slot, in a laptop computer 240. Unfortunately, any portion of a PC card 210 that extend outside the PC card slot 230 increases the likelihood of damage to the exposed portion during movement, in this case the fixed antenna portion 214. In addition, a PC card that extends outside the PC card slot will not allow a laptop computer to be stored in a typical laptop computer carrying case without first removing the extended PC card. This loose card then becomes much more likely to be misplaced or lost. Also, the extended PC card 210 shown, with its fixed external antenna portion 214, can interfere with other PC cards 235 positioned in adjacent PCMCIA slots in the computer 240 (see FIG. 7). The other PC cards 235 may require a connector attachment 240 or other types of access which would interfere 250 with the extended PC card 210.

SUMMARY

In general, in one aspect, the invention features a PC card with a retractable antenna for use in interfacing between a communications device and a wireless network, the PC card having an interface card portion and an antenna portion, the interface card portion having a first end, and an opposite second end, the first end having an electrical interface compatible with the communications device, the second end having an opening for slidably receiving the antenna portion, the interface card portion being dimensioned to be inserted into the PC card slot of the communications device, the antenna portion being in electrical communication with the interface card portion and dimensioned to fit inside the interface card portion, the antenna portion being accessible through the opening in the interface card portion by a user, the antenna portion being configured to extend out of the cavity and retract into the cavity of the interface card portion such that when the antenna portion is retracted into the cavity the antenna portion is substantially contained inside the interface card portion.

Embodiments of the invention may include one or more of the following features. The PC card slot can be a PCMCIA slot. A locking mechanism can be located in the interface card portion, the locking mechanism being configured to selectably lock the antenna portion in the retracted position and release the antenna portion to be extended. A spring can be positioned in the cavity with one end attached to the interface card portion and the opposite end attached to the antenna portion, the spring being in a compressed state when the antenna portion is retracted in the cavity and the spring being in an extended state when the antenna portion is extended. The interface card portion can have internal rails and the antenna portion can have rail guides that are compatible with the rails such that during retraction or extension of the antenna portion the rail guides slide on the rails.

In general, in another aspect, the invention features a communications device for use in communicating with a wireless network, including a PC card slot, the PC card slot having an electrical connector; and a PC card sized to be insertable into the PC card slot, the PC card having a retractable antenna in electrical communication with the electrical connector, in an extended position a majority of the antenna being located outside of the PC card slot, in a retracted position a majority of the antenna being located inside the PC card slot.

Embodiments of the invention may include one or more of the following features. The PC card slot can be a PCMCIA slot. The PC card with retractable antenna can include an interface card portion, the interface card portion having a first end, and an opposite second end, the first having an electrical interface compatible with the communications device, the second end having an opening for slidably receiving the antenna portion, the interface card portion being dimensioned to be inserted into the PC card slot of the communications device; and the antenna portion can be in electrical communication with the interface card portion and dimensioned to fit inside the interface card portion, accessible through the opening of the interface card portion by a user, and configured to extend out of the cavity and retract into the cavity of the interface card portion such that when the antenna portion is retracted into the cavity the antenna portion is substantially contained inside the interface card portion. A locking mechanism can be located in the interface card portion, the locking mechanism being configured to selectively lock the antenna portion in the retracted position and release the antenna portion to be extended. A spring can be positioned in the cavity with one end attached to the interface card portion and the opposite end attached to the antenna portion, the spring being in a compressed state when the antenna portion is retracted in the cavity and the spring being in an extended state when the antenna portion is extended. The interface card portion can have rails on each side of the cavity and the antenna portion can have rail guides that are compatible with the rails such that during retraction or extension of the antenna portion the rail guides slide on the rails.

In general, in another aspect, the invention features a method of using a communications device in conjunction with a PC card having a retractable antenna for communicating with a wireless network, the method including providing a communications device having a PC card slot; inserting the PC card into the PC card slot, the PC card being in electrical contact with the communications device; extending the retractable antenna from the PC card, the retractable antenna extending out of the PC card slot; and communicating between the communications device and the wireless network.

Embodiments of the invention may include one or more of the following. The PC card slot can be a PCMCIA slot. The step of extending the retractable antenna can include unlocking the retractable antenna. The PC card can include an interface card portion and an antenna portion, the antenna portion being selectably extendible and retractable from a cavity in the interface card portion.

Embodiments of the invention may include one or more of the following advantages. A wireless network card with an integral antenna, compatible with a PC card slot of a portable communication device, can simply and compactly communicate with a wireless network. A wireless network card equipped with the retractable antenna of the present invention can avoid signal interface with the portable communication device, but does not have to be removed from the portable communication device during storage or transportation. The wireless network card can include a variety of electronic components, and its antenna can be quickly deployed by a user yet remain safely within the wireless network card when not in use.

Other features and advantages of the present invention should be apparent from the following description.

DRAWINGS

DESCRIPTION

Figure 1:
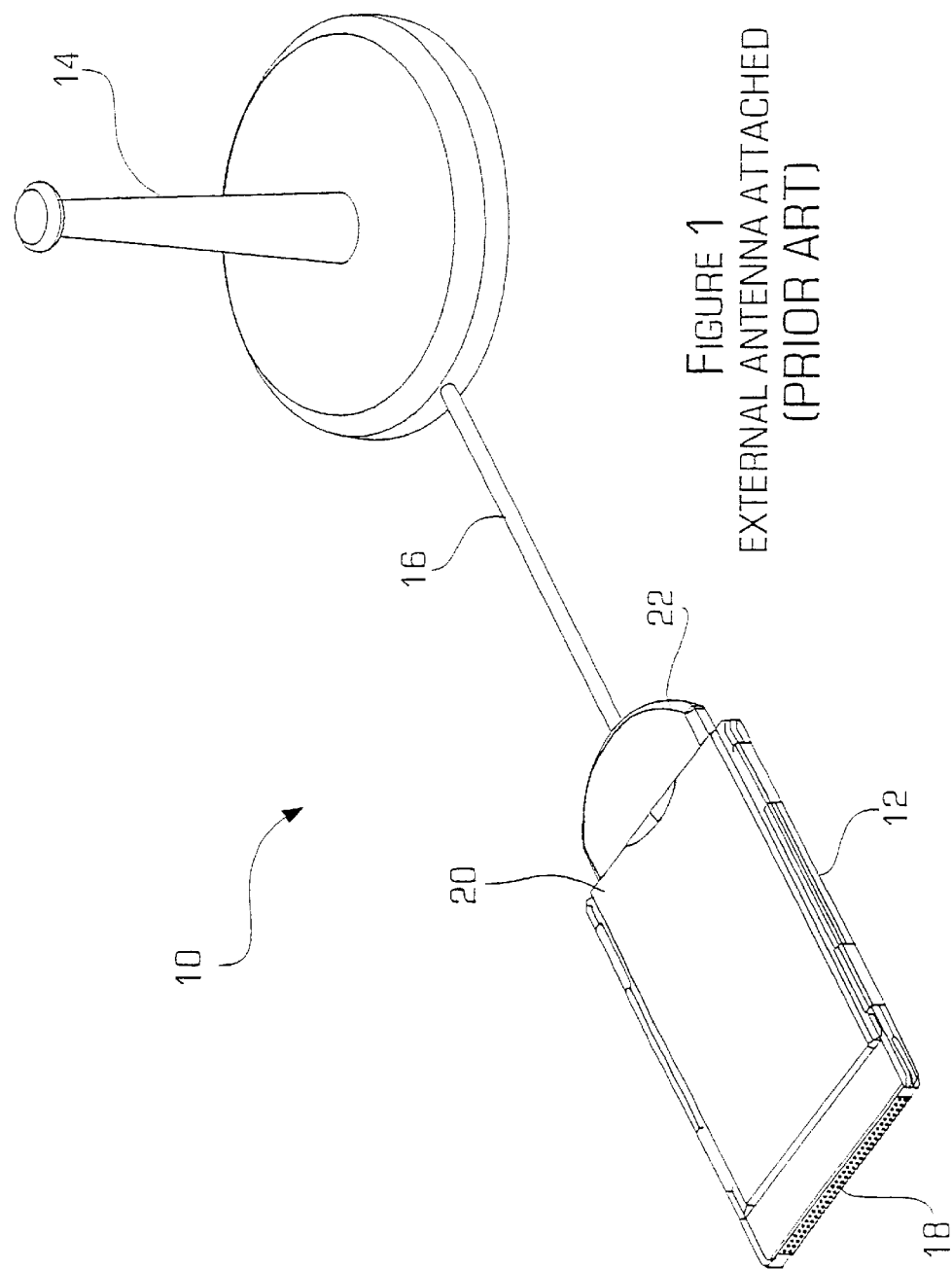
FIG. 1 is a perspective view showing one wireless network card assembly known in the prior art.
Figure 2:
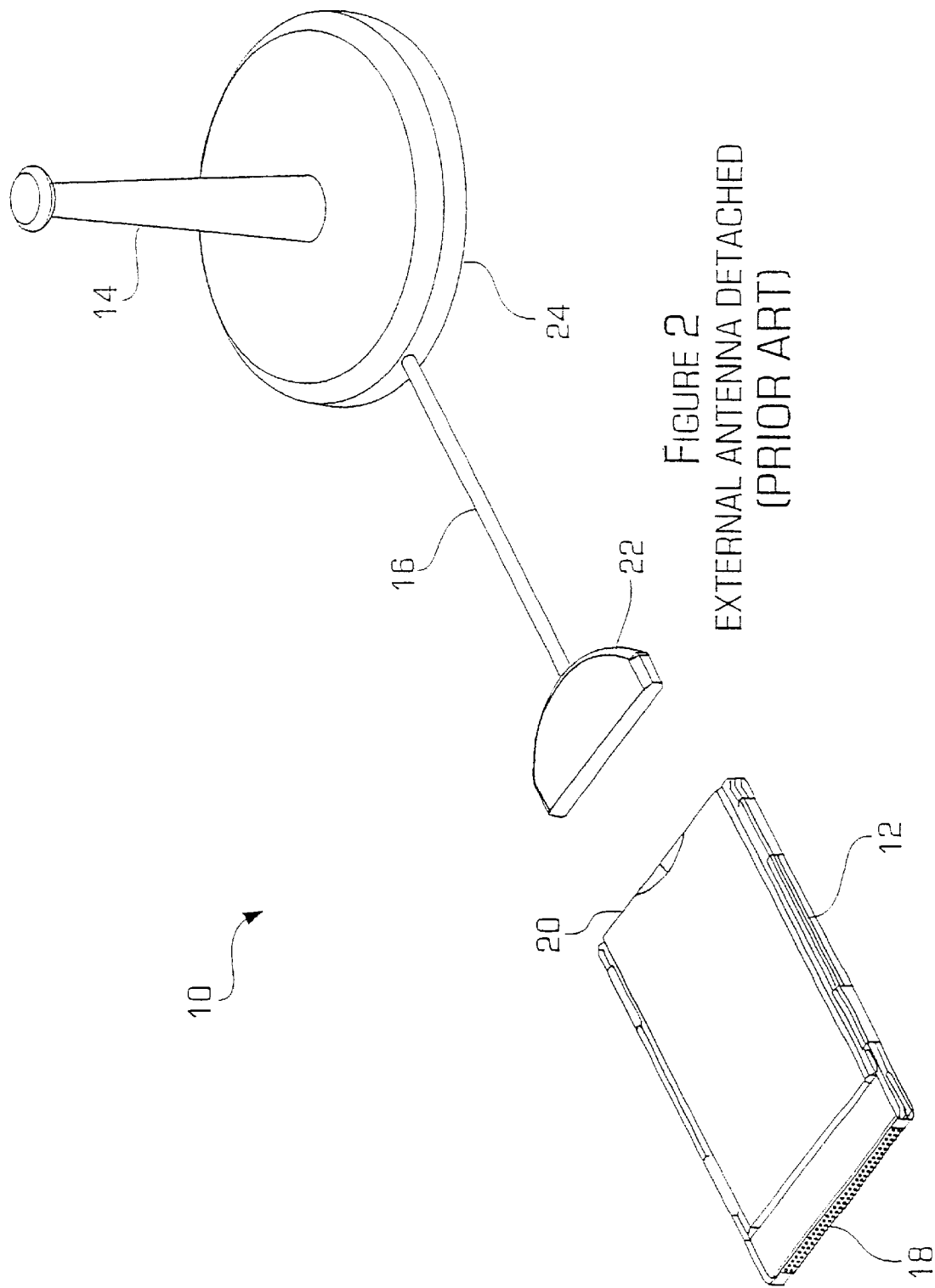
FIG. 2 is a perspective showing the wireless network card assembly of FIG. 1 with the antenna detached from the wireless network card.
Figures 3, 4:
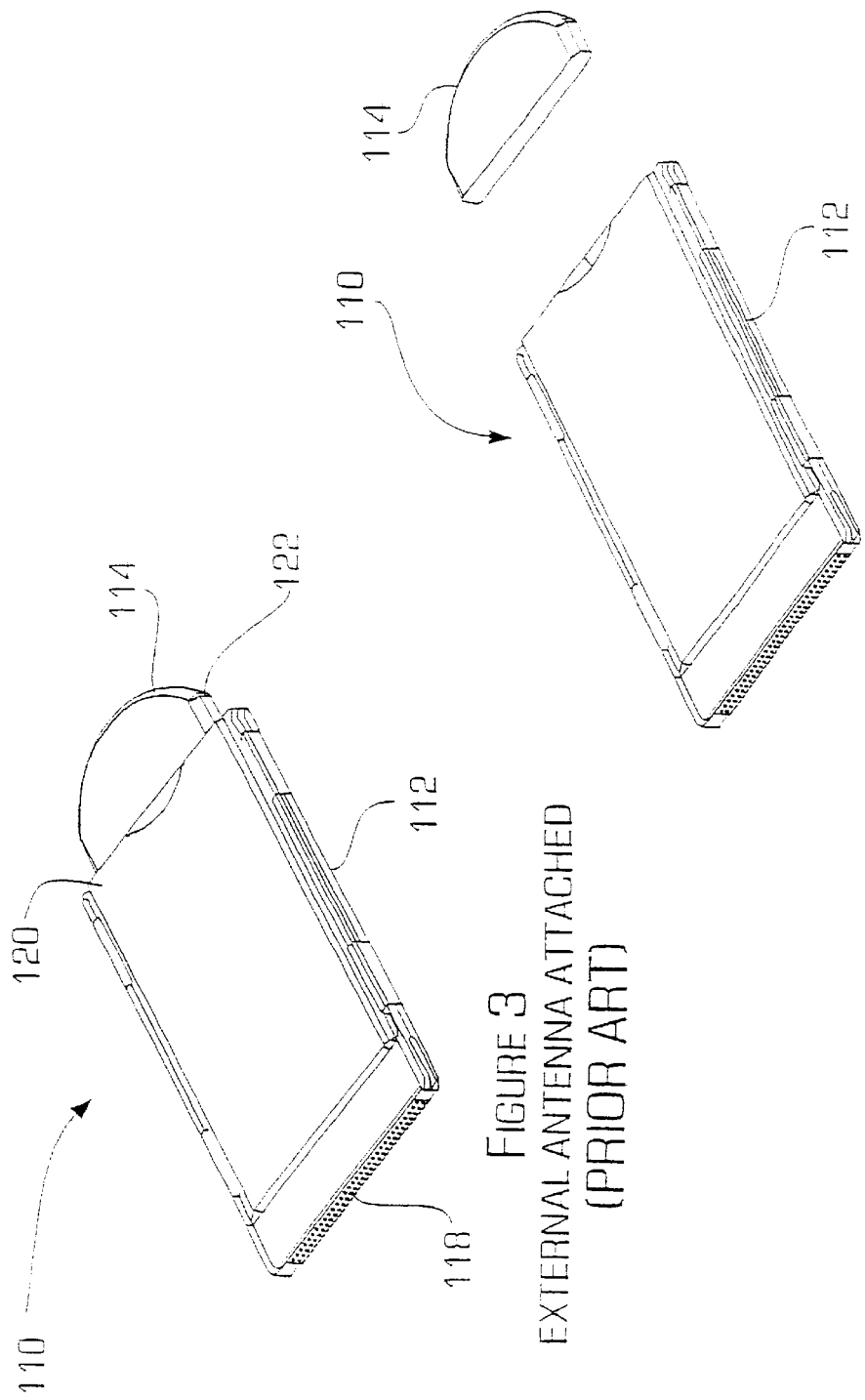
FIG. 3 is a perspective view showing another wireless network card assembly known in the prior art.
FIG. 4 is a perspective showing the wireless network card assembly of FIG. 3 with the antenna detached from the wireless network card.
Figure 5:
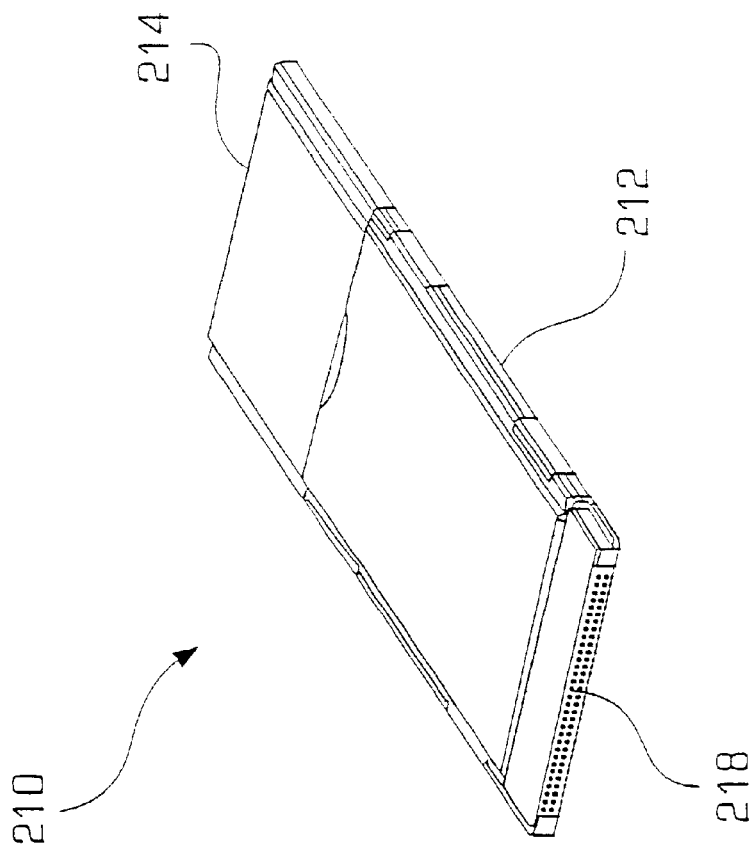
FIG. 5 is a perspective view showing an extended wireless network card known in the prior art.
Figure 6:
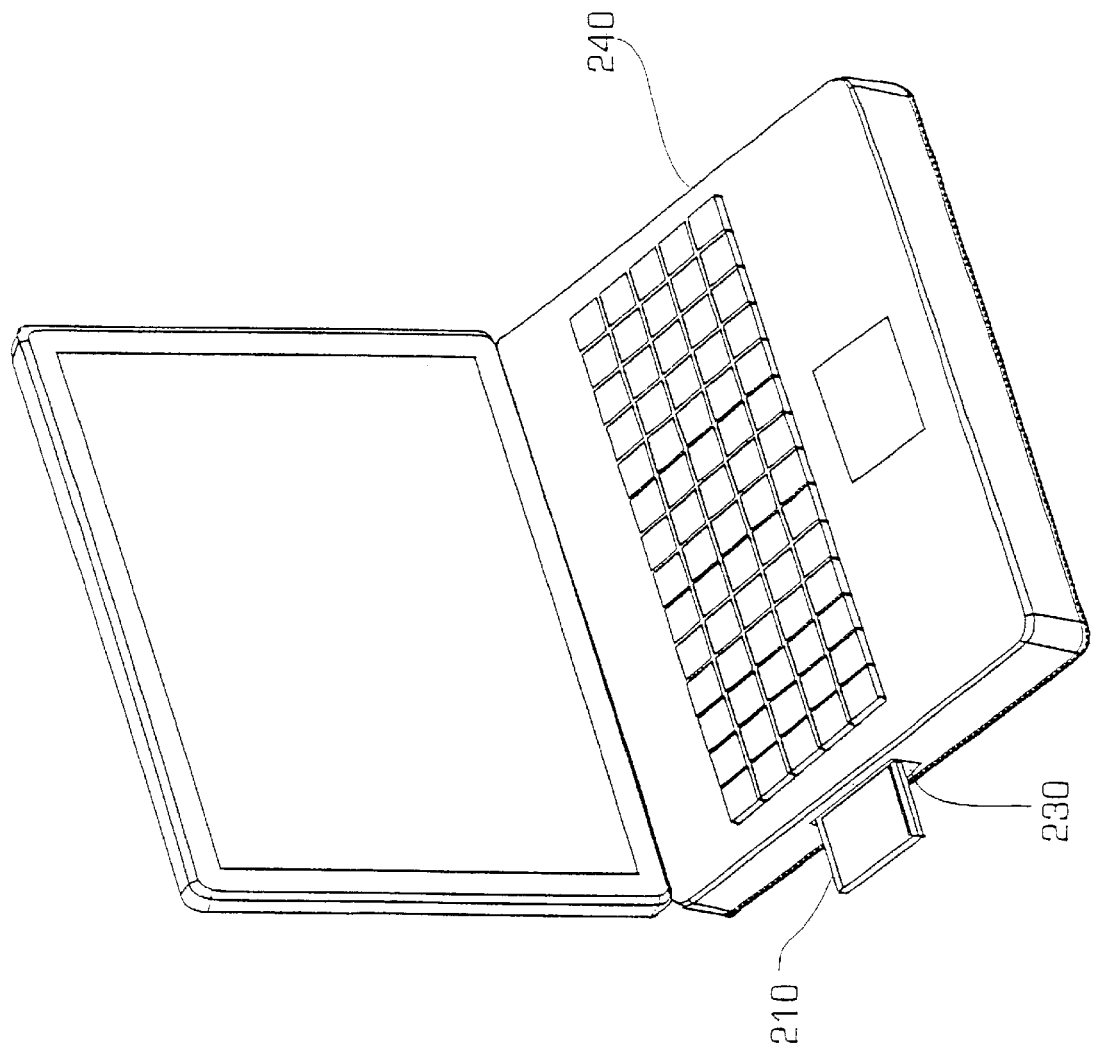
FIG. 6 is a perspective view of a portable communications device with the extended wireless network card of FIG. 5 positioned in a PC card slot of a portable communications device.
Figure 7:
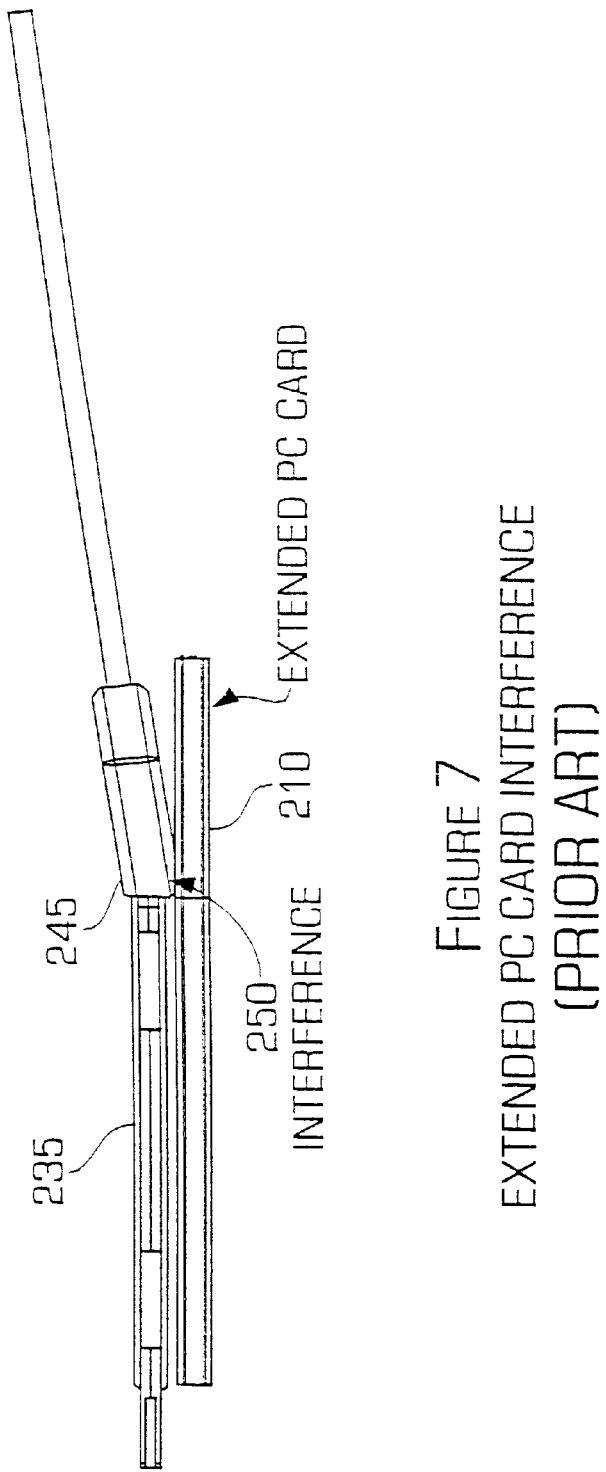
FIG. 7 is a sectional view showing the extended wireless network card of FIG. 5 installed in a lower PC card slot of a portable communication device interfering with an adjacent PC card installed in another PC card slot of the portable communications device.
Figure 8:
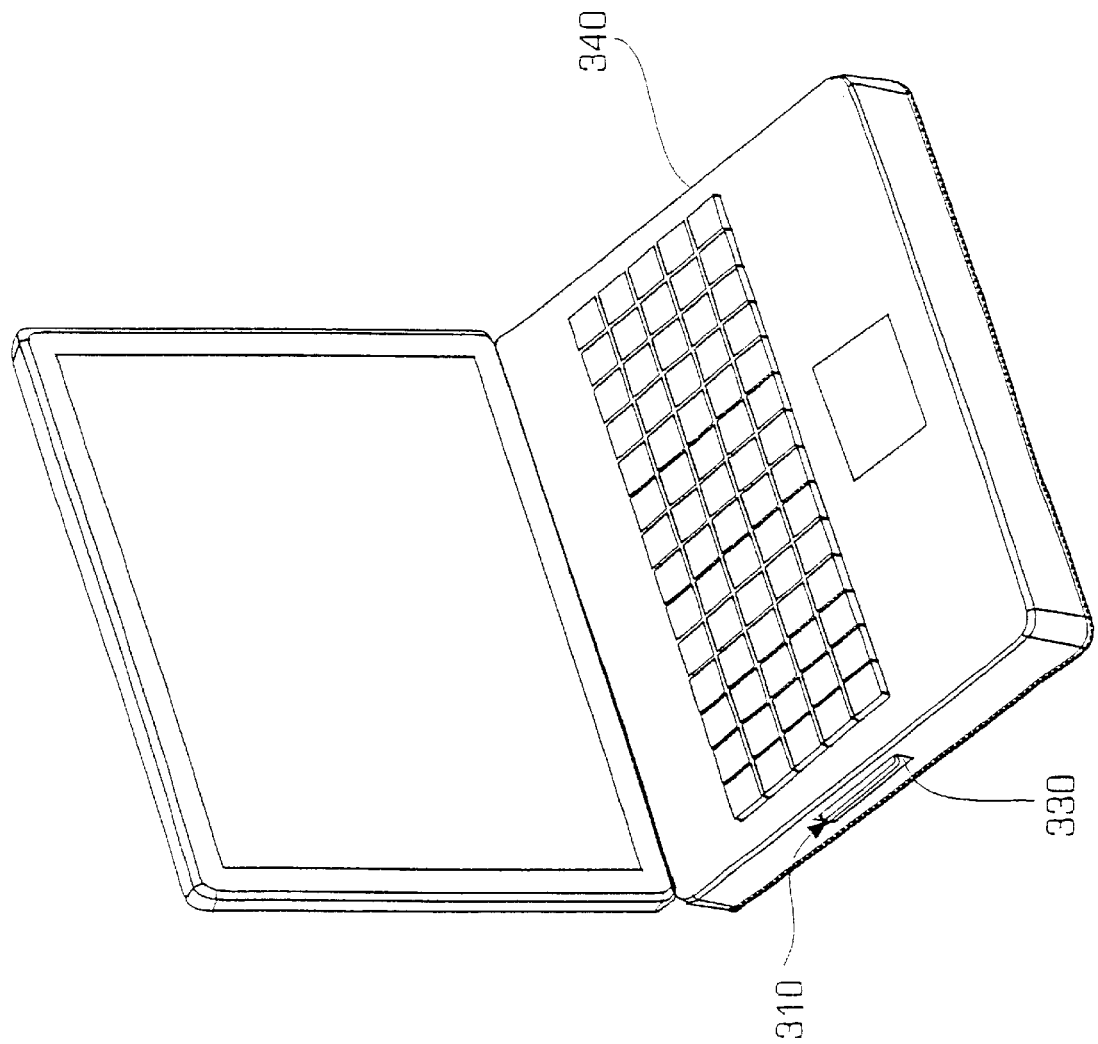
FIG. 8 is a perspective view of a PC card with retractable antenna of the present invention installed in a portable communications device with the antenna retracted.
Figure 9:
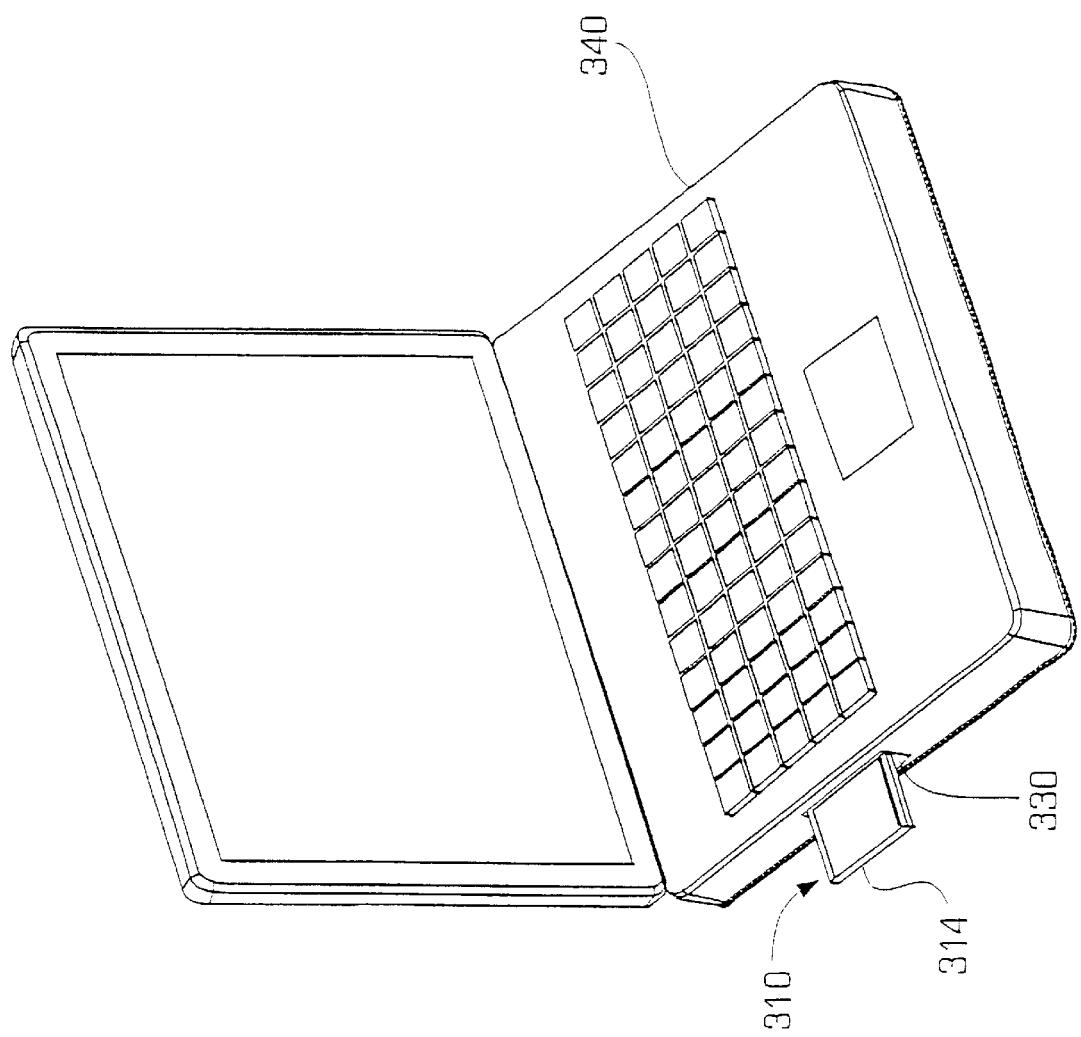
FIG. 9 is a perspective view of a PC card with retractable antenna of the present invention installed in a portable communications device with the antenna extended.

FIG. 8 is an instructive illustration of the present invention used in conjunction with a laptop computer 340 having a PC card slot 330 located in the side of the computer housing. The PC card slot 330 may be compatible with the PCMCIA standard. The specific description of the present invention is shown and described in relation to a laptop computer application for clarity and ease of understanding. It is to be understood however, that the invention can be used with many other communications devices as well. The wireless network card or PC card 310 of the present invention is shown in the PC card slot 330. The PC card 310 has a antenna portion 314 that maybe extended or deployed while the PC card 310 is inside the PC card slot 330 of the computer 340 (as shown in FIG. 9). While the antenna portion 314 is deployed, the computer 340 may communicate with a wireless network. The associated circuitry used for wireless network communication may also be located on the card, as described below.

Figure 10:
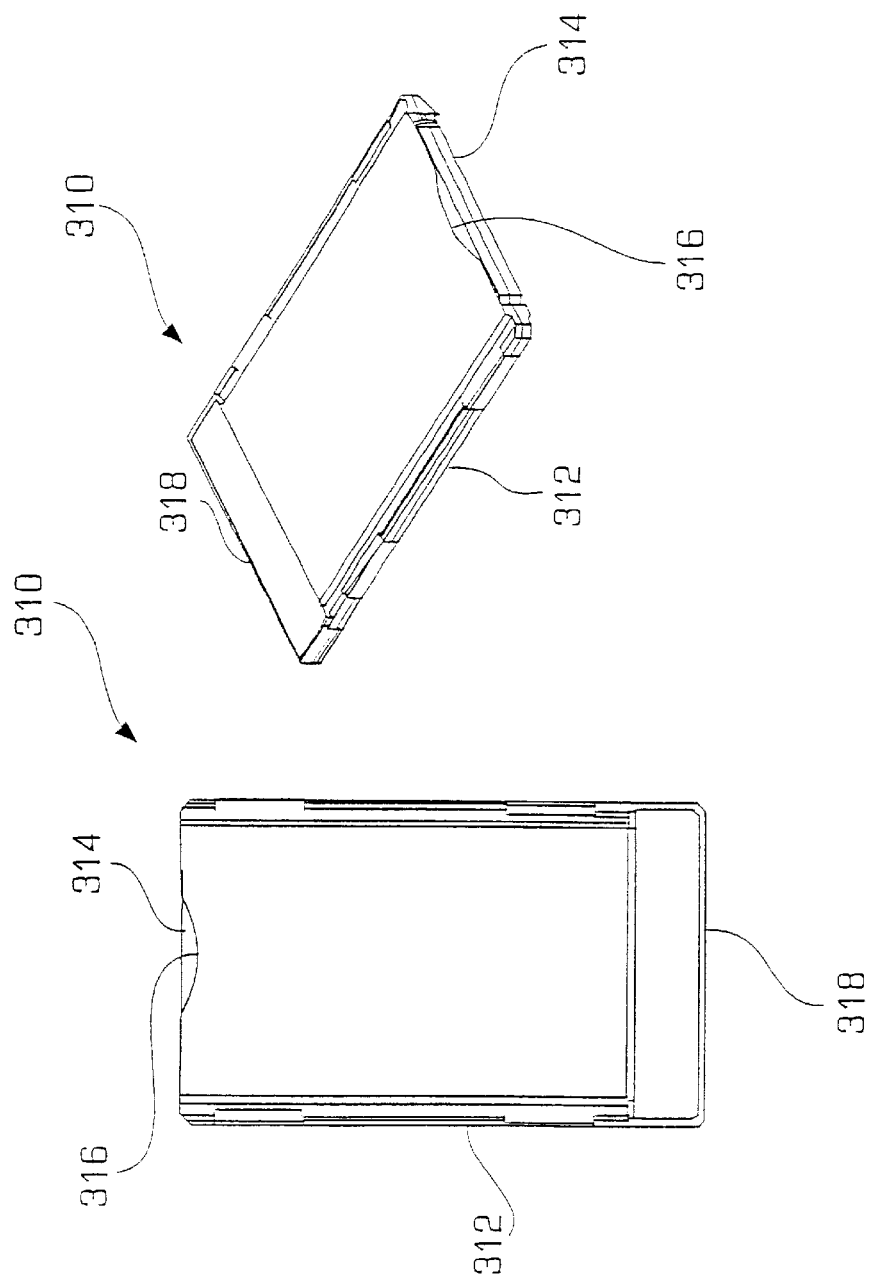
FIG. 10 is a top view and perspective view of the PC card with retractable antenna of the present invention with the antenna in the retracted position.

FIG. 10 shows a top and perspective view of the PC card 310. The PC card 310 has an interface card portion 312 and an extendible antenna portion 14. In FIG. 10, the antenna portion 314 is retracted in a cavity, drawer or slot in the PC card 310. The PC card 310 is sized to fit in a standard PC card slot, such as a typical PCMCIA slot. The PCMCIA standard size is approximately 55 mm in width and 5 mm in depth. The length of the PC card 310 with the antenna portion 314 retracted is approximately 85 mm in length. At the end opposite the antenna portion 314 is a electrical interface 318 that is designed to electrically connect the PC card 310 to the communications device 340 when the PC card 310 when it is fully inserted into the PC card slot 330 of the communications device 340.

Figure 11:
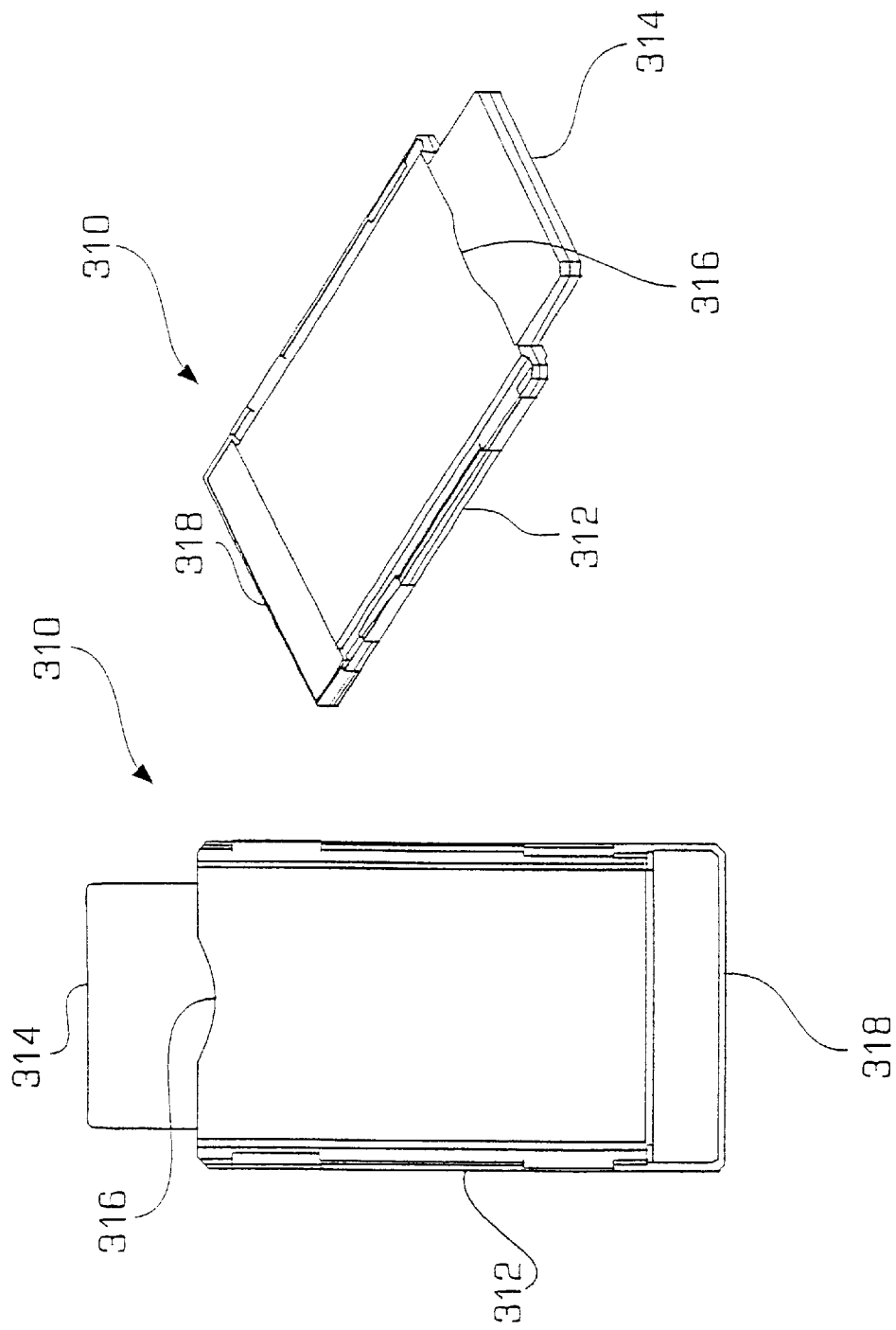
FIG. 11 is a top view and perspective view similar to FIG. 10 with the antenna in the extended position.

FIG. 11 shows the antenna portion 314 extended out of the interface card portion 312. In the extended position, the antenna portion 314 extends outside the PC card slot 330 of the laptop computer 340 (as shown in FIG. 9). As can be seen in FIG. 10, the antenna portion 314 is accessible near a recess 316. In one embodiment, the antenna portion 314 is extended by accessing the antenna portion 314 through the recess 316 and pulling it out. In another embodiment, the antenna portion 314 is spring loaded such that pushing the antenna portion 314 in the area of the recess 316 releases a locking mechanism and extends the antenna portion 314 out of the interface card portion 312. To retract the antenna portion 314 into the interface card portion 312, the antenna portion 314 is pushed in until it is locked into place with the locking mechanism.

Figure 12:
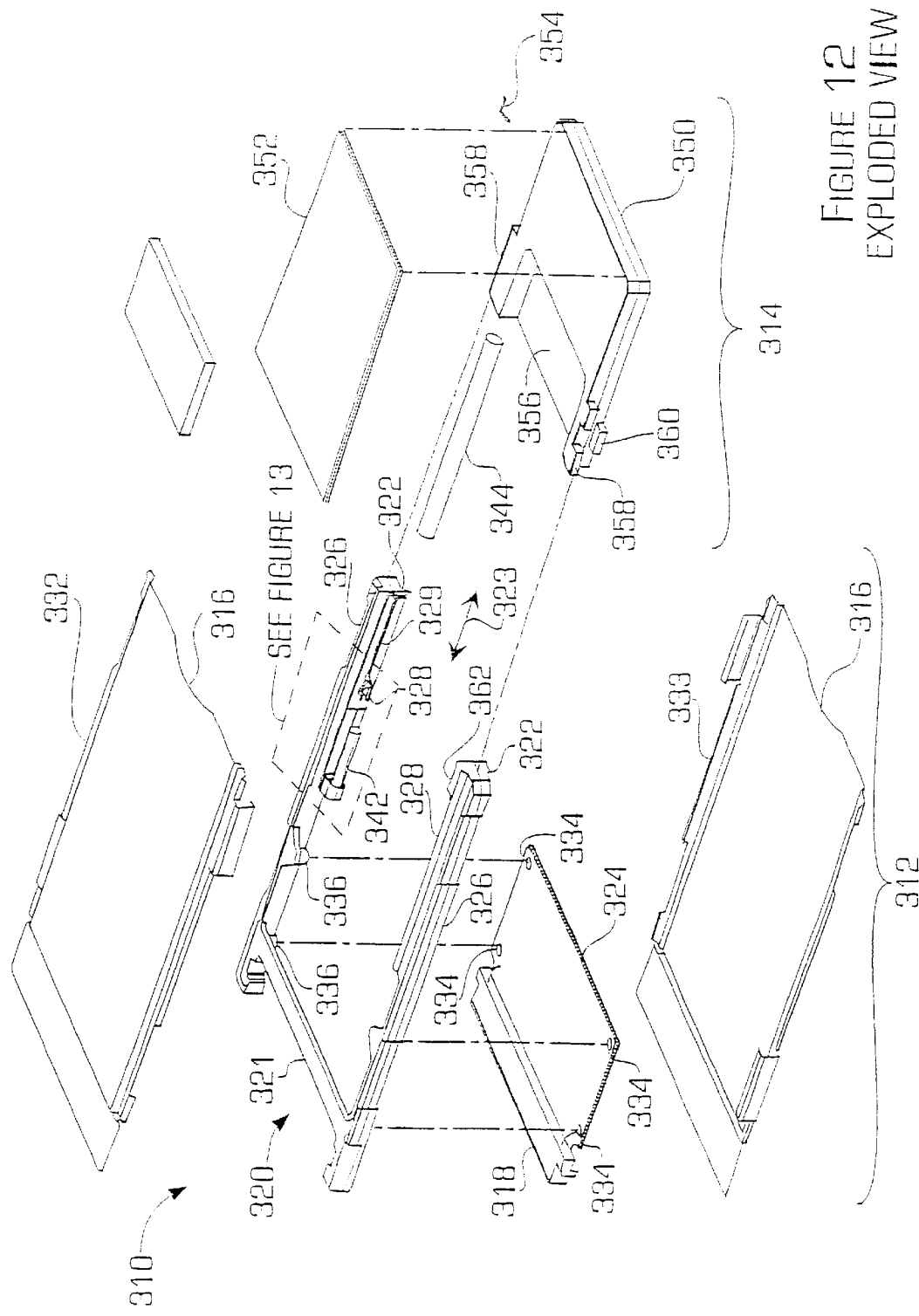
FIG. 12 is an exploded view of the present invention showing the component of the PC card with retractable antenna.

FIG. 12 is an exploded view of the PC card 310 shown in FIGS. 10 and 11. The interface card portion 312 of the PC card 310 includes a frame section 320 and a circuit card 324 that are positioned between a top cover 332 and a bottom cover 333. The antenna portion 314 may be slid into or out of an opening or slot 322 when the top cover 332 and the bottom cover 333 are attached together. The top and bottom covers protect the frame 320 and circuit card 324, and also protect the antenna portion 314 when it is retracted in the interface card portion 312.

Figure 13:
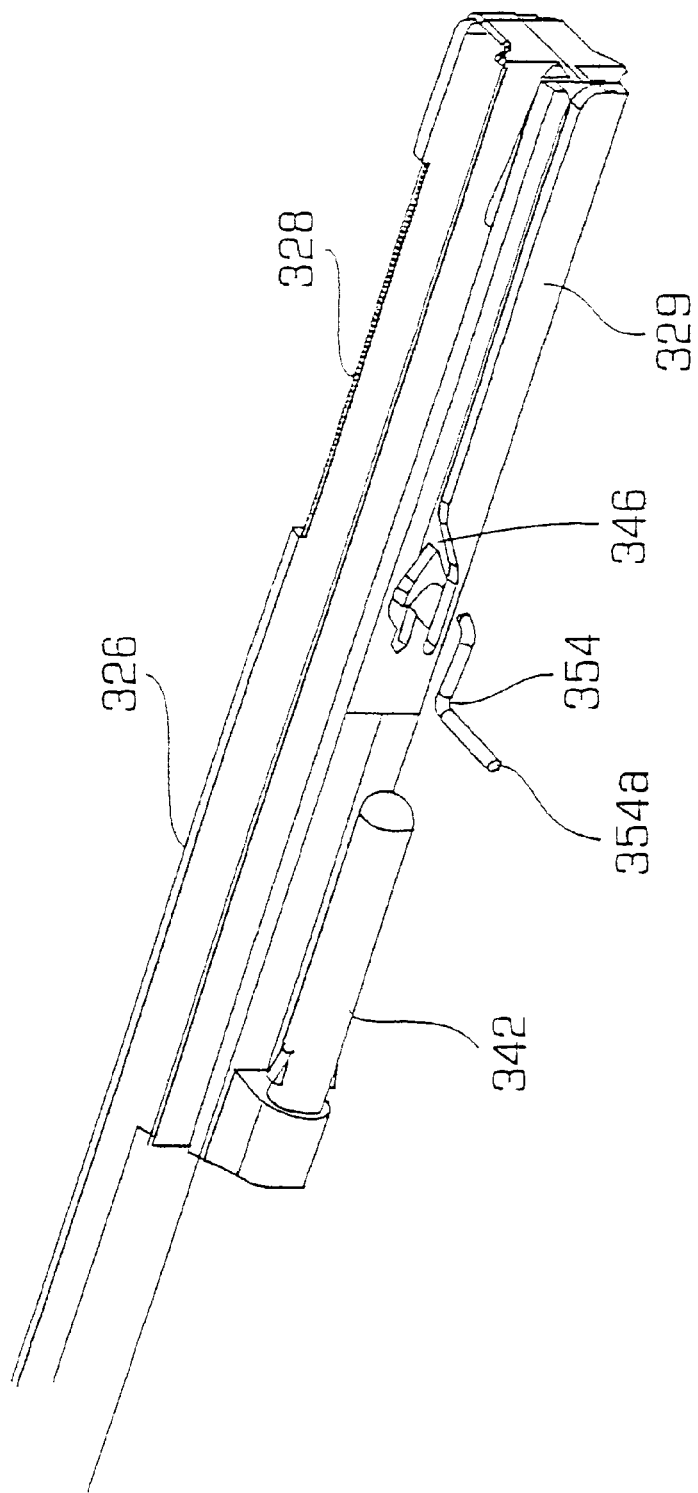
FIG. 13 is a more detailed view of the cam and a cam track.

The frame section 320 has a closed end 321, an open end 322 and side rails 326. The side rails 326 have guide rails 328 that are compatible with the antenna portion 314, such that the antenna portion 314 will slide into and out of the open end 322 (see arrow 323). Located on one of the side rails 328 is a cam track 329 with locking mechanism 346 and a spring base 342 that will support a spring 344. FIG. 13 shows more detail of the guide rails 328, spring base 342 and a locking/unlocking mechanism 346 that will be discussed below.

The circuit card 324 has a interface connector 318 that is used to provide electrical interface to a mating connector within the PC card slot 330 of the laptop computer 340. The circuit card 324 can include a variety of electronic components, such as a battery or transmit/receive electronics, that are required to support the functions of the PC card 310. These functions can include, e.g., memory, programming, a modem or a facsimile. The circuit card 324 has locating holes 334. These holes 334 correspond to locating pins 336 on the side rails 326 of the frame 320. The circuit card 324 is received by the frame 320 and supported by the locating pins 336.

The antenna portion 314 consists of an antenna body 350, a top layer 352 and a cam 354 (see FIG. 13). A communication antenna can be embedded in the antenna body 350, where the materials used for the antenna body 350 are then transparent to the 30 frequencies that the communication antenna is designed to receive and/or transmit. In the preferred embodiment, the antenna body 350 is made of a plastic material and the antenna is embedded in the plastic material during fabrication. Other electrical components may also be embedded in the antenna body 350 such as transmit/receive electronics or other components to perform necessary functions. The antenna portion 314 is in electrical communication with the circuit card 324. A recess 356 is formed in antenna body 350 to avoid interference with other components in the interface card portion 312, such as the circuit card 324. At the sides of the antenna body 350 are upper guides 358 and lower guides 360. These guides interface with the guide rails 328 of the side rails 326 so that the antenna body slides into and out of the interface card portion 312. Stops 362, located on the side rails 326, stop the guides 358, 360 from sliding all the way out of the interface card portion 312.

FIG. 13 shows more detail of the cam 354 and the cam track 329. One end of the cam 354a is attached to the antenna body 350 while the other end is inserted into the cam track 329. The cam track 329 terminates into a locking mechanism 346. In a first position, the locking mechanism 346 locks the cam 354 in place, preventing the antenna portion 314 from being extended. In a second position, the locking mechanism 354 releases the cam 354 so that the cam 354 travels in the cam track 329 allowing the antenna portion 314 to be extended or deployed out of the interface card portion 312.

During assembly, the interface card portion 312 is assembled with the frame section 320 and circuit card 324 positioned between the top cover 332 and bottom cover 333. A spring 344 is placed on the spring base 342 and attaches to the antenna portion 314. The antenna body 350 is positioned in the open end 322 with the guides 358 and 360 of the antenna body 350 being slidably received by the guide rails 328. The end 354a of the cam 354 is positioned in the antenna body 350 while the opposite end is positioned in the cam track 329 of the side rail 326. When the antenna portion 314 is retracted, the spring 344 is compressed. When the antenna portion 314 is extended, the spring 344 is expanded, helping the antenna portion 314 extend.

In use, the PC card 310 is inserted into a PC card slot 330 of a laptop computer 340. The antenna portion 314 may either be extended or retracted. The extension or retraction of the antenna portion 314 from the interface card portion 312 is similar to the performance of a ball point pen. To extend the antenna portion 314 from the interface card portion 312, the antenna portion 314 is slightly depressed near 316 (see FIG. 10). As the antenna portion 314 is depressed, the locking mechanism 346 releases the cam 354. The spring 344 then expands and pushes the antenna portion 314 with the guides 358, 360 sliding on the guide rails 328 until the guides 358, 360 reach the guide stop 362. At this point, the antenna portion 314 is fully extended out of the interface card portion 312, as shown in FIG. 11 and outside of the PC card slot 330, see FIG. 9. To retract the antenna portion 314, the antenna body 350 is pushed back into the interface card portion 312 compressing the spring 344, with the guides 358, 360 sliding along the guide rails 328. The cam 354 follows the cam track 329 until it reaches the locking mechanism 346. The cam 354 is then locked by the locking mechanism 346, locking the antenna portion 314 in the retracted position in the interface card portion 312, shown in FIGS. 8 and 10. Locking the antenna portion 314 in the retracted position allows the PC card 310 to remain inside the laptop computer PC card slot 330 (as shown in FIG. 8), causing no interference with either the laptop computer 340 or and adjacent PC cards in use.

While the invention herein disclosed has been described by means of specific embodiments and applications thereof, numerous modifications and variations could be made thereto by those skilled in the art without departing from the scope of the invention set forth in the claims.

We claim:

1. A PCMCIA card comprising:
    an interface card portion having a cavity accessible by a user;
    an antenna portion configured to (i) fit inside said cavity and (ii) extend out of said interface card portion;
    a locking mechanism located in said cavity and configured to lock said antenna portion when retracted and release said antenna portion for extension; and
    a circuit card fixed inside said cavity and in communication with said antenna portion, wherein said antenna portion has a recess to accommodate said circuit card while retracted.

2. The PCMCIA card according to claim 1 wherein said PCMCIA slot has a depth no greater than 5 millimeters.

3. The PCMCIA card according to claim 1, wherein said interface card portion has internal rails and said antenna portion has rail guides that are slidable along said rails.

4. The PCMCIA card according to claim 1, further comprising:
    an electrical interface coupled to said interface card portion and in communication with said circuit card.

5. The PCMCIA card according to claim 1, further comprising:
    a spring disposed between said interface card portion and said antenna portion to bias said antenna away from a retracted position.

6. The PCMCIA card according to claim 5, wherein said spring biases said antenna portion against said locking mechanism while locked.

7. The PCMCIA card according to claim 1, wherein said antenna portion comprises:
    an antenna; and
    a body enclosing said antenna and made of a material transparent to at least one frequency of said antenna.

8. The PCMCIA card according to claim 1, further comprising a plurality of pins protruding into said cavity to position said circuit card.

9. The PCMCIA card according to claim 1, wherein said interface card portion comprises:
    a frame;
    a top cover connected to said frame; and
    a bottom cover connected to said frame opposite said top cover.

10. A communications device comprising:
    a PCMCIA slot; and
    a PCMCIA card sized to be insertable into said PCMCIA slot and comprising (i) an antenna wherein a majority of said antenna is located outside said PCMCIA slot in an extended position and all of said antenna is located inside said PCMCIA slot in a retracted position, (ii) a locking mechanism configured to lock said antenna in said retracted position and release said antenna and (iii), a circuit card in communication with said antenna, wherein said antenna has a recess to accommodate said circuit card while at said retracted position.

11. The communications device according to claim 10, wherein said PCMCIA slot has a depth no greater than 5 millimeters.

12. The communications device according to claim 10, wherein said PCMCIA card further comprises:
    an interface card portion having (i) a first end with an electrical interface compatible with said communications device and (ii) a second end having an opening.

13. The communications device according to claim 12, wherein said PCMCIA card further comprises:
    an antenna portion having (i) said antenna, (ii) an electrical connection between said antenna and said circuit card and (iii) dimensions to fit inside said interface card portion.

14. The communications device according to claim 12, wherein said interface card portion has rails and said antenna portion has rail guides that are slidable along said rails.

15. The communications device according to claim 10, wherein said circuit card is configured for communicating on a wireless network.

16. A method of using a communications device having a PCMCIA slot, comprising the steps of:
    (A) inserting a PCMCIA card into said PCMCIA slot with an orientation that allows a user to access a retractable antenna within said PCMCIA card;
    (B) pressing said retractable antenna inward to release a locking mechanism for said retractable antenna, wherein said retractable antenna surrounds a portion of a circuit card fixed in said PCMCIA card while unlocking; and
    (C) biasing a portion of said retractable antenna out of said PCMCIA card.

17. The method according to claim 16, further comprising the step of:
    extending said retractable antenna from said PCMCIA card to engage a mechanical stop within said PCMCIA card.

18. The method according to claim 16, further comprising the step of:
    communicating between said communications device and said wireless network via said retractable antenna.

19. The method according to claim 16, further comprising the steps of:
    moving said retractable antenna toward said PCMCIA slot; and
    automatically locking said retractable antenna after said retractable antenna is fully inside said PCMCIA slot.

20. The method according to claim 16, further comprising the step of:
    holding said retractable antenna inside said PCMCIA card while said locking mechanism is engaged.

* * * * *